April 14, 1970     H. E. RIORDAN     3,505,877

GAS-BEARING INERTIAL DISTANCE METER

Filed Nov. 21, 1966     2 Sheets-Sheet 1

INVENTOR
Hugh E. Riordan
BY S. A. Giarratana &
F. L. Masselle
ATTORNEYS

April 14, 1970     H. E. RIORDAN     3,505,877

GAS-BEARING INERTIAL DISTANCE METER

Filed Nov. 21, 1966     2 Sheets-Sheet 2

INVENTOR
Hugh E. Riordan
S. A. Giarratana
F. L. Masselle
BY
ATTORNEYS

United States Patent Office 3,505,877
Patented Apr. 14, 1970

3,505,877
GAS-BEARING INERTIAL DISTANCE METER
Hugh E. Riordan, Wyckoff, N.J., assignor to Singer-General Precision Inc., a corporation of Delaware
Filed Nov. 21, 1966, Ser. No. 595,957
Int. Cl. G01p 7/00
U.S. Cl. 73—490                                    1 Claim

ABSTRACT OF THE DISCLOSURE

An accelerometer comprising a mass mounted on a helically threaded gas bearing screw so that acceleration causes the mass to move along the screw and E-bridge pickoff means disposed adjacent the mass to produce an output signal depending on the relative position of the mass along the screw.

---

This invention relates to a distance meter which is actuated by a force which is due to acceleration, and more particularly relates to a distance meter which depends upon a pressurized gas bearing for frictionless operation.

In many aeronautical systems, it is necessary that the distance traveled by a vehicle be measured accurately, reliably and simply. For example, in the case of a missile, this distance information is used for guidance, control or warhead safing, arming, and fusing, uses in which reliability is of the utmost importance. Previous metering devices have involved the measurement of acceleration, which has been converted to distance by double integration of the acceleration by complex electronic or electromechanical devices. Direct mechanical inertial distance meters have been constructed, but these devices have relied upon ball bearings, linkages and other mechanical devices which are subject to jamming or high friction, and hence provide inaccurate or unreliable data.

It is accordingly one of the objects of the present invention to provide a simple non-electronic distance meter.

It is a further object of the present invention to provide a distance meter which is substantially free of mechanical friction.

It is yet another object of the present invention to provide a distance meter with only one moving part which affects the accuracy and reliability of the instrument.

Other objects and advantages of the present invention will become apparent to one skilled in the art from the following description and drawings, wherein.

Figure 1:
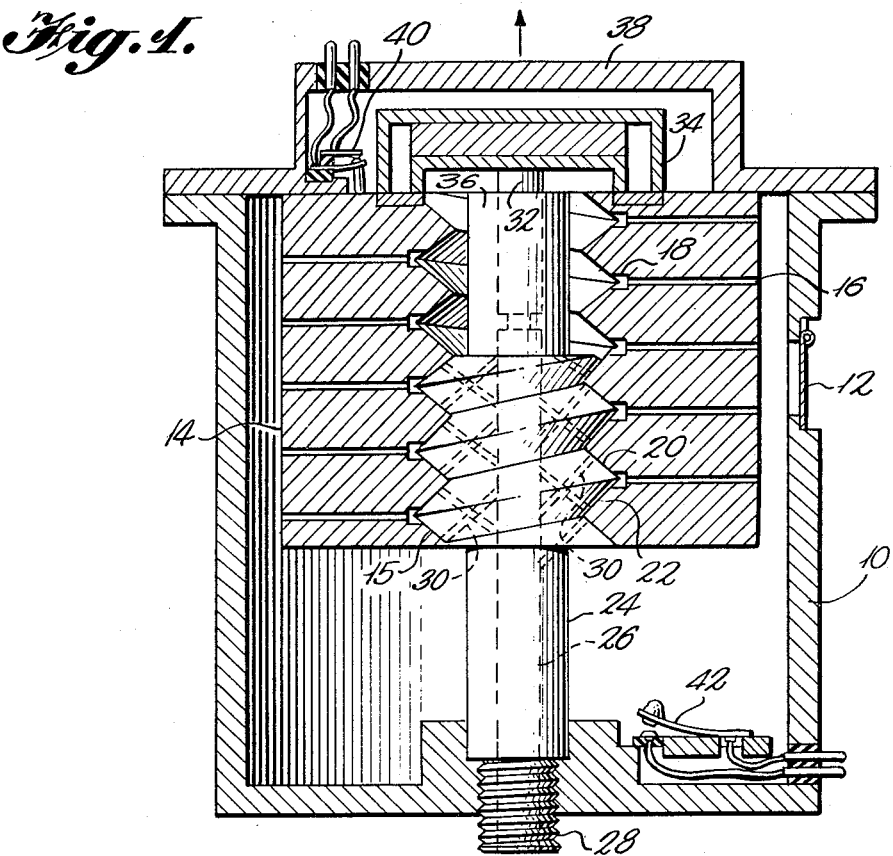
FIGURE 1 is a section of the preferred embodiment of the present invention.

As shown in FIGURE 1, the distance meter of the present invention generally comprises a meter case 10 equipped with gas vent 12. Contained within the instrument case is an inertial mass or nut portion 14 which is threadably engaged with gas bearing journal screw 15. The inertial mass 14 is provided with gas exhaust vents 16 which extend radially from the helical vent groove 18 through the inertial nut and terminate at the outer surface thereof so that the gas exhaust vent 16 communicates with the casing of the instrument. The helical vent groove 18 is positioned at the apex of the V-shaped threads, the faces of the V-shaped thread being defined by surfaces 20 and 22. The surfaces 20 and 22 serve as the female threads in the screw and nut arrangement. The screw support 24 which is attached to the lower portion of case 10 contains therein a gas supply tube 26 which is connected between a gas supply connection 28 and gas supply ports 30. The gas supply ports 30 are passages extending from the gas supply tube 26 through the threads of the gas bearing journal screw 15 and terminate at the surfaces of the threads of the gas bearing journal screw 15. Thus, when a gas is supplied to the gas supply tube 26, it travels through the gas supply ports 30 and impinges upon surfaces 20 and 22 of the inertial nut to provide a cushion of gas for the inertial nut, and thus gives rise to substantially frictionless operation of the inertial nut.

At the top of the gas bearing journal screw 15, there is mounted unlatching piston 32 which serves to force the latch magnet 34 contained within the upper portion meter case 10 away from the inertial mass 14 when it is desired to set the meter in operation. The unlatching piston 32 is carried within cylinder 36, which is the upper portion of the screw support 24, and is connected to the gas supply tube 26 at the upper end thereof. The unlatching piston in the embodiment shown in FIGURE 1 is actuated by gas under pressure from gas supply connection 28 and moves the latch magnet 34 to the case top 38 so that the latch magnet will no longer retain the inertial mass 14 in the ready position as illustrated in the figure. The latch magnet 34 may either be a permanent magnet or an electromagnet. Its function, as noted, is primarily to retain the inertial mass in the ready position until it is desired to set the meter in operation. A limit switch 40 is positioned to be actuated when the mass 14 is in its initial position as shown in FIGURE 1 so that it may be determined when the inertial mass has been released by the latch magnet 34 and mass 14 has started its travel away from its initial position. The lower portion of meter case 10 is equipped with a limit switch 42 which is actuated when the inertial mass has traveled a predetermined distance in a direction axially with respect to screw 15.

In operation, the meter as shown is connected to a gas supply by way of gas supply connection 28. The latch magnet 34 which retains the inertial mass 14 in the ready position is forced upwardly and away from the inertial mass 14 by unlatching piston 34, which is actuated by gas pressure from the gas supply. When the latch magnet is released from the inertial mass 14, the inertial mass is free to rotate about the gas bearing journal screw 15. Substantially frictionless operation is maintained by feeding a gas under pressure to the surfaces of the gas bearing journal screw threads by gas supply ports 30. Thus, the gas flows through gas supply tube 26 into gas supply ports 30. The gases escaping from gas supply ports 30 impinge upon surfaces 20 and 22 of the inertial mass to provide a cushion of gas between these surfaces and the surfaces of the threads of the gas bearing journal screw. This cushion of gas gives rise to substantially frictionless operation. Once the gases have passed through the gas supply ports 30 and impinged upon surfaces 20 and 22 of the inertial nut, the gases then pass into the helical gas vent groove 18, which communicates with gas exhaust vents 16. Thus, the gases are vented through the helical vent groove 18 and the gas exhaust vents 16 to the instrument casing 10. By means of gas vent 12 in the casing 10, the gases are allowed to escape from the system. As the meter assembly is accelerated in the direction indicated by the arrow in the drawing, the force from the acceleration tends to cause the inertial mass to rotate, thereby being displaced axially down the gas bearing journal screw. The speed of rotation of the inertial mass will be proportional to the integral of acceleration of the instrument, or the velocity of the instrument. Therefore, the distance traveled by the inertial mass will be proportional to the integral of velocity of the instrument, or the distance traveled by the instrument and hence the distance traveled by any vehicle in which the instrument is carried.

It can be shown that for essentially frictionless mechanism, the displacement of the inertial mass relative to the base of the instrument is given by the following formula $$\lambda = \frac{y}{\left(1 + \frac{4\pi^2 P^2 J}{m}\right)}$$

in which $\lambda$ equals the displacement of the inertial mass relative to the screw, $y$ equals the displacement of the vehicle, $P$ equals the screw pitch in threads per unit length (single thread), $J$ equals the moment of inertia of the inertial mass about the screw axis and $m$ equals the mass of the nut. Thus, by the use of the simple formula the displacement of the vehicle can easily be determined by the displacement of the inertial mass relative to the screw. The above equation also represents a simple method of determining design sizes of the components of the instrument of the present invention when the general range of displacement of the vehicle is known. In the preferred embodiment, in order that gas not be wasted and pressure be properly maintained at the bearing ports, it is preferred that the length of the threaded portion of the inertial mass exceed the length of the screw by at least a distance of travel of the inertial mass, thereby assuring that the supply ports are covered at all times.

In the foregoing description, the latch magnet is moved by the unlatching piston away from the inertial mass a sufficient distance so that the holding force of the magnet is essentially zero. This type of operation permits the meter to begin operation immediately in the presence of any acceleration. However, the latch magnet need not operate in this manner. For example, it is possible, and often preferred, to reduce the clearance between the latch magnet 34 and the upper portion of case 38 so that the unlatching piston will move the magnet a more limited distance away from the inertial mass, which distance reduces but does not completely eliminate the holding force of the magnet. Thus, there is required the application of an acceleration over and above a predetermined value before the unit can operate. In this type of operation, the threshold acceleration must give rise to a force which exceeds the holding force of the magnet after it has been moved the limited distance by the unlatching piston.

This type of operation can also be provided by employing a fixed magnet, as opposed to the movable magnet as shown in FIGURE 1, which fixed magnet has a soft iron keeper which can be moved into position by the piston to short circuit some of the magnetic flux, and thereby reduce the holding force of the fixed magnet.

It is also possible to omit the piston altogether by employing a magnet firmly fixed to the case top 38. Such a fixed magnet secures the inertial mass until the acceleration of the vehicle in which the instrument is carried exceeds a value whereby the product of acceleration and the mass of the inertial mass exceeds the holding force of the magnet. Thus, in this type of operation, the meter does not begin to operate until the acceleration produces a force which exceeds the holding force of the magnet.

Figure 2:
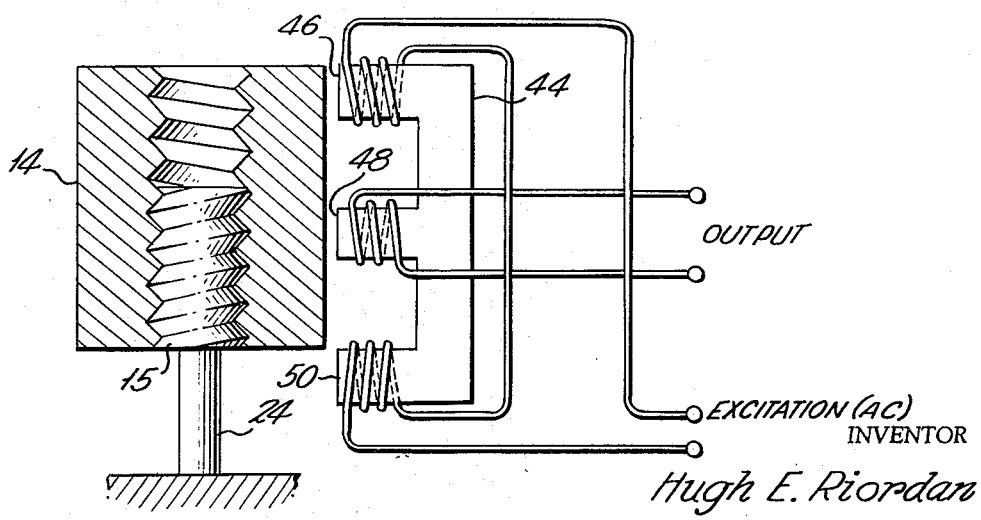
FIGURE 2 illustrates an alternative system for measuring the output of the instrument of the present invention.

As shown in FIGURE 1, the inertial mass closes limit switch 42 when it has been displaced a prescribed distance. However, the position of the inertial mass can be determined by the use of a continuous reading analog. One such system for determining the position of the inertial mass is depicted in FIGURE 2, wherein a differential transformer 44 is provided with the inertial mass 14 as a movable core therein. The primary windings of the transformer 44 wound on poles 46 and 50 are excited in series and are connected so that the flux coupled to the secondary winding wound on pole 48 from the pole 46 is out of phase with the flux coupled to the secondary winding from pole 50. As the mass 14 moves from the pole 46 toward the pole 50, the amplitude of the output signal induced in the secondary winding will decrease until the mass 14 gets to half way between the poles 46 and 50, whereupon the phase of the output signal will reverse and the amplitude will increase with further movement of the mass 14 toward the pole 50. Thus, the amplitude and phase of the output signal will represent the position of the mass 14 and therefore the displacement of the vehicle carrying the meter.

Figure 3:
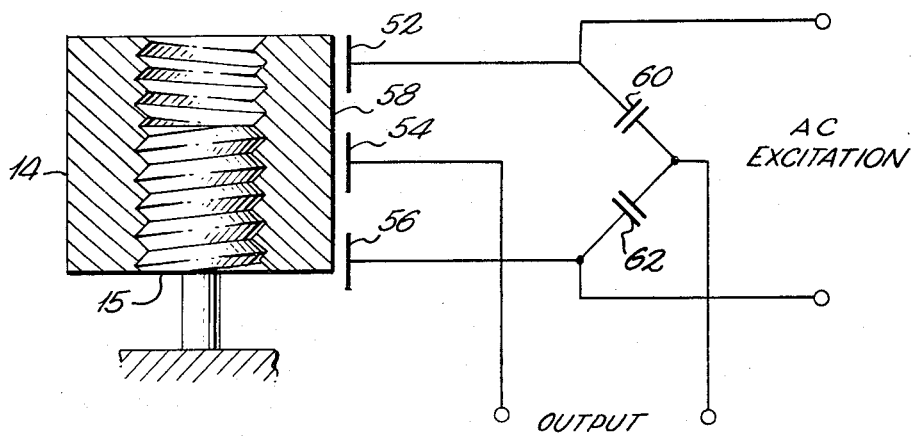
FIGURE 3 illustrates still another system for measuring the output of the present invention.

Still another system for detecting the position of the inertial mass as it moves relative to the gas bearing journal screw is shown in FIGURE 3. This device utilizes variable area capacitors comprising plates 52, 54 and 56 with the surface 58 of the inertial mass 14 being the opposite plate of these capacitors. In this device, an AC excitation voltage is applied between the plates 52 and 56 and an output signal is produced between the plate 54 and a reference point connected to the plates 52 and 56 by capacitors 60 and 62 of equal value. As the mass 14 moves downwardly, the energy coupled to the plate 54 from plate 56 will increase and the energy coupled to the plate 54 from the plate 52 will decrease. Accordingly, as the inertial mass 14 moves downwardly, the amplitude of the output signal will at first decrease until the mass 14 is midway between plates 52 and 56, whereupon the phase of the output signal will reverse and the amplitude of the output signal will increase with further downward movement of the mass 14. Thus, the phase and amplitude of the output signal will represent the position of the mass 14.

Figure 4:
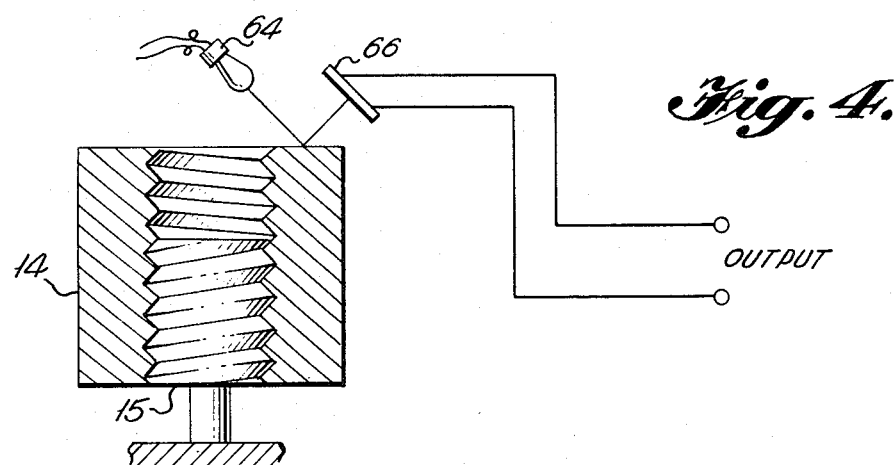
FIGURE 4 illustrates still another system for determining the output of the present invention.

A further system to detect the position of the inertial mass as it is displaced relative to the gas bearing journal screw is shown in FIGURE 4. In this system, a light source 64 is provided to illuminate the top of the inertial mass 14 which reflects the illumination to photoelectric detector 66. In the operation of this system, the quantity of the reflected light decreases as the inertial mass 14 moves downwardly with respect to the gas bearing journal screw, thus causing a decrease in the output of the photo-electric detector. The output of the photoelectric detector thus gives a signal representing the position of the inertial mass.

Figure 5:
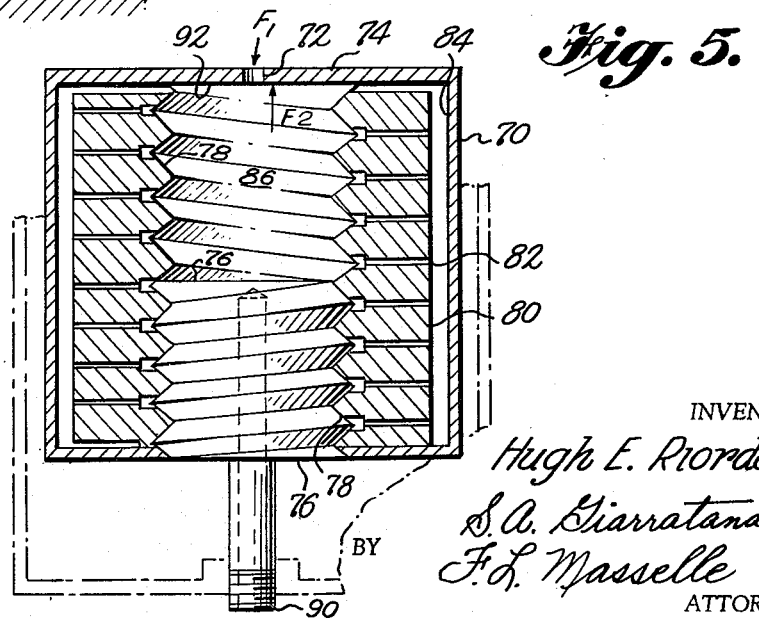
FIGURE 5 is a section of another embodiment of the present invention.

In some applications of distance meters of the present invention, for example, in a vertically launched rocket, it may be desirable to provide a fixed biased force throughout the displacement of the inertial mass so that the indicated distance will represent the true distance of the rocket unaffected by the acceleration due to gravity acting upon the inertial mass. FIGURE 5 discloses such a device in which the biasing force is created by the bearing gas supply. As shown in FIGURE 5, there is provided a nut 70 which is substantially sealed except for the bleed orifice 72 located on the top 74. Gas bearing journal screw 76 is threadably engaged with the threads 78 on the female threaded portion 80 of the inertial mass 70. This female threaded portion 80 is equipped with bearing exhaust ports 82 as in the device depicted in FIGURE 1. Between the outer surface of the female threaded member 80 and the inner surface of nut 70, there is provided a bearing exhaust manifold 84. The inner chamber 86 defined by the female threaded portion 80 communicates with the bearing exhaust manifold 84 by exhaust ports 82, which are the same as those depicted in FIGURE 1. The gas bearing journal screw 76 is equipped with gas supply ports as shown in FIGURE 1, but which are not shown in the present figure, which gas supply ports are connected to a regulated gas supply 90.

In operation, the device as illustrated in this embodiment is operated in much the same manner as the embodiment depicted in FIGURE 1. Thus, gas is supplied to gas supply ports of screws 76 through gas supply 90, and passes through these gas supply ports (which are not shown in the drawing as noted), and impinges on female screw threads 78 to provide a gas cushion. The gases escaping from the gas cushion pass through the gas exhaust ports 82 and into the bearing exhaust manifold 84. However, the bearing exhaust manifold is substantially sealed so that the same pressure existing in this manifold 84 exists in the inner chamber 86 because the gas is free to pass in both directions through gas exhaust ports 82. Thus, the gas vents 82 located above the screw 76 permit the pressure to equalize on both sides of the female threaded element 80. Since the pressure contained within the nut 70 is permitted to escape only through bleed orifice 72, the bleed orifice 72 tends to throttle the flow of gas therethrough and a pressure builds up within nut 70. This pressure exerts a force on the area designated as 92 to provide a force thereon generally designated as $F_2$ in the figure. This force $F_2$ tends to offset the force caused by the acceleration due to gravity $F_1$ so that the force acting upon the nut 70 represents the true acceleration of the instrument independent of any acceleration due to gravity. The proper bias force is provided by making bleed orifice 72 of such a size that the gas pressure on area 92 provides a bias force which is substantially equal to the force due to gravity.

While the invention has been described above with reference to nut being the female threaded member, it is to be understood that the rotatable nut could be the male threaded member. In such an alternative, the female portion of the meter would be fixed and carry the gas supply passages, and the male portion would be free to rotate within the fixed female threaded portion.

While it will be apparent to one skilled in the art that the embodiments of the invention described are well calculated to fulfill the objects of the invention, it will be appreciated that the invention is susceptible to variation, modification and change without departing from the proper scope or fair meaning of the appended claims.

What is claimed is:

1. In an inertial displacement meter comprising a gas bearing journal screw having threads thereon, an elongated inertial mass having an internal bore therein, said bore having threads therein adapted to receive the threads of said screw, so that said mass is caused to rotate about said screw and is displaced axially in relation thereto when said meter is subjected to acceleration, and means responsive to the displacement of said mass to produce an output signal depending upon said displacement, the improvement therein in which the means responsive to the displacement of said mass includes an E-bridge three-pole transformer having two oppositely wound primary windings at the outer poles and a secondary winding at the inner pole, means for applying a signal to said transformer, said E-bridge transformer being disposed adjacent to said mass, so that said mass completes the magnetic circuit of said E-bridge transformer, whereby the output of said secondary winding of said transformer changes in phase and amplitude as said mass moves between one primary winding and the other primary winding, means for generating a cushion of gas between said mass and said screw including ports defined in said screw for feeding gas under pressure to an area between said threads of said mass and said screw, a helical groove at the apex of said threads of said mass, and passages extending radially through said mass, said grooves communicating with said passages to permit the escape of gas from said threads, and, magnetic means for preventing rotation of said mass about said screw until said meter is to be operated, including a latch magnet to prevent rotation of said mass about said screw, said latch magnet magnetically engaging the top of said mass, a gas piston contained within the upper portion of said screw, and means for supplying gas to said piston whereby said magnet is displaced axially with respect to said screw and away from said mass by said piston when said piston is activated.

References Cited

UNITED STATES PATENTS

| | | | |
|---|---|---|---|
| 2,974,529 | 3/1961 | Brueggeman et al. | 73—503 |
| 3,120,760 | 2/1964 | Waldhauer | 73—490 |
| 3,122,023 | 2/1964 | Gledhill | 73—503 XR |
| 3,129,592 | 4/1964 | Bracutt | 73—490 |
| 3,148,547 | 9/1964 | Angele | 73—490 |
| 3,212,340 | 10/1965 | Benckert | 73—490 |
| 3,212,341 | 10/1965 | Keller | 73—503 |
| 3,229,529 | 1/1966 | Chang | 73—490 |

JAMES J. GILL, Primary Examiner